United States Patent

Miki et al.

[15] 3,642,518
[45] Feb. 15, 1972

[54] TREATMENT OF POLYESTER MATERIALS

[72] Inventors: Masakazu Miki; Yasuhiro Takeuchi; Hisaharu Kuwahara, all of Okayama, Japan

[73] Assignee: Kuraray Co., Ltd., Kurashiki, Japan

[22] Filed: Mar. 20, 1970

[21] Appl. No.: 21,483

[30] Foreign Application Priority Data

Mar. 20, 1969 Japan..............................44/21438

[52] U.S. Cl. .................117/72, 117/7, 117/47 A, 117/76 T, 117/76 F, 117/77, 117/80, 117/138.8 F, 156/110 A, 156/335
[51] Int. Cl. ......................................B44d 1/14, B32l 27/36
[58] Field of Search ..................117/76 T, 76 F, 138.8 F, 72, 117/77, 80, 47 A; 156/110 A

[56] References Cited

UNITED STATES PATENTS

| | | | |
|---|---|---|---|
| 3,222,238 | 12/1965 | Krysiak | 117/76 T X |
| 3,240,649 | 3/1966 | Atwell | 117/138.8 F X |
| 3,231,412 | 1/1966 | Pruitt et al. | 117/76 T |
| 3,383,242 | 5/1968 | Macura et al. | 117/138.8 F |
| 3,436,288 | 4/1969 | Patterson | 117/72 X |
| 3,460,973 | 8/1969 | Hantzer et al. | 117/76 T |
| 3,307,967 | 3/1967 | Vanderbilt et al. | 117/77 |
| 3,376,188 | 4/1968 | Clayton et al. | 117/76 T X |

Primary Examiner—Murray Katz
Assistant Examiner—Ralph Husack
Attorney—William Kaufman and Barry Kramer

[57] ABSTRACT

Polyester materials are treated to increase their adhesion to rubber by contacting the polyester material with a treating liquor containing a silane of the formula:

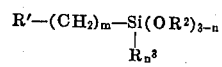

wherein $R'$ is an organic radical selected from the group consisting of vinyl, epoxycycloalkyl, glycidyloxy, acryloyloxy, methacryloyloxy and amino alkylene amino; $R^2$ is a radical selected from the group consisting of hydrogen, lower alkyl and lower alkoxy alkyl; $R_3$ is a lower alkyl radical; $m$ is an integer from 0 to 3; and $n$ is an integer of 0 or 1, and thereafter contacting the resulting material with a treating agent containing as the sole adhesive a resorcinol-formaldehyde latex.

8 Claims, No Drawings

TREATMENT OF POLYESTER MATERIALS

This invention relates to processes for treating polyester materials for use in reinforcing rubber products.

More particularly, the invention relates to processes for treating polyester materials containing high-molecular weight polyesters in the form, for example, of filaments, fibers, yarns, strands, cords, cord-fabrics, films or the like, wherein said materials are treated with a treatment liquor containing a silane compound and thereafter treated with a resorcinal-formaldehyde latex.

Although polyester materials possess desirable properties as reinforcing materials for rubbers, such as high-tensile strength, excellent dimensional stability, shock resistance and heat resistance, as their molecular structure contains essentially no functionally reactive groups, good adhesion of said polyesters to rubber has been difficult to obtain by adhesive treatment methods conventionally employed with polyamide materials or rayon filaments. For example, adhesives such as resorcinal-formaldehyde latex (referred to herein as ("RFL") do not give satisfactory results when used for the adhesion of polyesters to rubber.

Many methods have been heretofore employed to enhance the adhesion of polyesters to rubber. For example, a polyisocyanate or an ethylene-urea resin has been applied to the polyester as a mixture with a rubber latex or the polyisocyanate or ethylene-urea resin can be first applied to the polyester and thereafter treated with a resorcinol-formaldehyde latex. However, such compounds are generally used as solutions in organic solvents, rendering such processes relatively expensive, and presenting explosion hazards as well as problems of toxicity. Thus, use of these materials is considered undesirable in any commercial application.

Furthermore, when said compounds are used as aqueous dispersions with rubber, it is difficult to disperse said compounds and the dispersing operation requires a great expenditure of energy and an extremely long period of time. The resulting treatment liquors in the form of a solution or dispersion have a relatively short life, which makes them quite difficult to use in an effective manner because said liquors are unstable.

On the other hand, U.S. Pat. No. 3,297,467 describes a method wherein an aqueous dispersion of a curable combination of a polyglycidyl ether of an acyclic hydrocarbon substituted by at least three hydroxy groups and an amide curing agent with a lubricating agent, is first applied to the polyester and thereafter said polyester is further treated with resorcinol-formaldehyde latex. However, the treatment liquor in the form of said aqueous dispersion is unstable and its pot life is unexpectedly short, ranging from about 30 to 120 minutes at room temperature. Therefore, treatment by said liquor requires rapid application thereof to the polyester and severe control of the liquor temperature and concentration. Furthermore, the above-mentioned treatment results in polyester materials which are hardened and stiffened, so that many troubles occur in subsequent processing such as spinning, twisting, cording, weaving and bonding to rubber. Moreover, these methods are expensive and in addition the adhesion obtained is not sufficient.

One object of the invention is to provide a method of treating polyester materials, particularly polyester textile materials, for use in reinforcing rubber products, for example rubber tires, belts, hose or the like.

Another object of the invention is to provide a method of treating polyester materials which comprises applying a novel base coating of a silane compound without a curing agent and thereafter applying a second coating of resorcinol-formaldehyde latex treating agent.

Still another object of the invention is to provide an improved method of treating polyester materials for subsequent rubber adhesion, whereby it is possible to use an easily prepared aqueous treating liquor. Advantageously, polyester textile materials can be pretreated at practically any point during their manufacture or use, such as during the extrusion process of spinning of the polyester filaments, before or after twisting, weaving or fabricating into tire cord or similar rubber reinforcing structure without hardening and stiffening the textiles.

Yet another object of the invention is to provide an improved method of treating polyester textile materials in which the basic treatment liquor has a long pot life and said liquor condition can be easily controlled.

A further object of the invention is to provide a further improved method of pretreating the polyester filaments, in which basic treatment is carried out during the extrusion process of spinning without hardening and stiffening the filaments.

Other objects and advantages of the invention will become apparent from the following detailed description thereof and the appended claims.

The polyesters used in the invention are the high-molecular weight polyesters obtained from alpha, omega-glycols and dicarboxylic acids, particularly any one of the high-molecular weight polyesters obtained from polymethylene glycols and the aromatic dicarboxylic acids. As the most typical of these can be cited polyethylene terephthalate which is obtained from ethylene glycol and terephthalic acid.

It has been found, in accordance with the present invention, that the rubber adhesion properties of polyester materials can be improved by a process which includes a first treatment step of applying a treatment liquor containing a silane compound to the said materials and a second treatment step of applying the resorcinol-formaldehyde latex to said treated materials. It is considered especially advantageous to apply heat treatment in said treatment steps.

The first treatment step is carried out by applying the treatment liquor containing a silane compound of the formula:

$$R'-(CH_2)_m-\underset{R^3_n}{Si}(OR^2)_{3-n}$$

wherein R' is an organic radical selected from the group consisting of vinyl, epoxycycloalkyl, glycidyloxy, acryloyloxy, methacryloyloxy and amino alkylene amino; $R^2$ is a radical selected from the group consisting of hydrogen, lower alkyl and lower alkoxy alkyl; $R^3$ is a lower alkyl radical; $m$ is an integer from 0 to 3; and $n$ is an integer of 0 or 1.

Examples of such compounds are:

$CH_2=CHSi(OC_2H_5)_3$: vinyltriethoxy silane $CH_2=CHSi(OCH_2CH_2OCH_3)_3$: vinyltri($\beta$-methoxyethoxy)silane

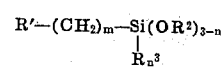—$CH_2CH_2Si(OCH_3)_3$: $\beta$(3.4-epoxycyclohexyl) ethyltrimethoxy silane $\underset{\diagdown O \diagup}{CH_2-CHCH_2O(CH_2)_3Si(OCH_3)_3}$: $\gamma$-glycidoxypropyltrimethoxy silane $CH_2=\underset{CH_3}{\overset{}{C}}-\underset{O}{\overset{\|}{C}}-O(CH_2)_3Si(OCH_3)_3$: $\gamma$-methacryloxypropyltrimethoxy silane $H_2N(CH_2)_2NH(CH_2)_3\underset{CH_3}{Si(OCH_3)_2}$: N-(dimethoxymethylsilylpropyl) ethylenediamine $H_2N(CH_2)_2NH(CH_2)_3Si(OCH_3)_3$: N-(trimethoxysilylpropyl) ethylenediamine and water-soluble condensation compounds thereof.

Such silane compounds are advantageously soluble in water alone or in alcohol-water mixture, and said silane compounds being soluble in alcohol-water mixture can be emulsified or dispersed in water alone by conventional means.

The first treatment liquor in accordance with the present invention is prepared as an aqueous solution, emulsion or dispersion and applied to the polyester without the addition of a curing agent or other compounds. Said liquor is very stable for a long time and therefore is preferable for use in continuous treating of polyester filament and the like. Such liquor has a long pot life, for example, for periods of about 2 to 10 days at room temperature. A further advantage of the invention resides in the fact that the above-mentioned silane compounds can be easily fixed onto the polyester by drying after treating with the liquor and cured on the polyester by heat-treating for very short periods of time without the addition of a curing agent.

Furthermore, since the first treatment liquor can be prepared as an aqueous solution, aqueous emulsion or dispersion of from about 0.1 percent by weight of the silane compound to any amount which can be readily dissolved or dispersed in aqueous medium and remain very stable, neither the concentration of said liquor nor the temperature of the liquor need be severely controlled to maintain the stability of the liquor. The preferable concentration of liquor is about 0.3 percent to about 10 percent by weight of the silane compound.

Especially preferable silane compounds, in accordance with the invention, are γ-glycidoxypropyltrimethoxy silane and γ-methacryloxypropyltrimethoxy silane, which are soluble in water. The treatment liquor of said silane compounds is especially stable for periods greater than 5 days. Said two silane compounds do not harden or stiffen the polyester materials after application and being fixed or cured to the polyester, and do not hinder a smooth, freely running filament or yarn. Furthermore, said two silane compounds give excellent adhesion force. Of course, treatment liquors containing said silane compounds, in the form of an aqueous solution, are easily prepared to any concentration of said compound.

One method of applying the silane compounds to the polyester materials is by impregnating or coating the polyester materials with treatment liquor containing the silane compound by conventional means, for example, by dipping the polyester materials into the treatment liquor, spreading the liquor over the polyester materials or coating the liquor on the polyester materials by roller means.

The absorption of the silane compound in the treatment liquor by the polyester material ranges from about 0.01 to 20 percent by weight of the polyester, and preferably from 0.05 to 2.0 percent.

Furthermore, it is preferable to carry out a heat-treatment after applying the silane compound to the polyester materials. Said treatment can be accomplished over a wide range of temperatures and treatment times, preferably from about 0.01 second up to 300 seconds at temperatures of between 150° and 240° C., especially between 200° and 235° C.

It is therefore possible to conduct said first treatment step of the invention at almost any point in the overall process from the production of the initial polyester filaments to the completed cord or cord fabrics, without any delay in usually rapid transfer of thread or yarn during and between the essential textile operations.

In a preferred embodiment of the invention, the first treatment can be applied and preferably heat-treated immediately after the polyester filaments have been extruded from the spinning melt and stretched for fiber orientation. At this point, the stretched filaments are normally conducted in a conventional manner through a heating chamber in which they are subjected to a slight shrinkage or heat-setting by means of superheated steam or hot air. In this process, a lubricating agent is usually applied to the filaments, for example a spinning oil, to provide a smooth, freely running filament. The filaments can be moistened on a godet with the treatment liquor of the invention or with a mixture of the spinning oil and the treatment liquor of the invention before entering said heating chamber. The temperature normally used in the heat-setting step is then sufficient to provide the proper shrinkage of the filaments and is at the same time sufficient to heat-fix the silane compound of the invention. Thereafter, the filaments are also smooth and flexible and the twisting or cording process can be carried out without any difficulty.

In said combination of the present invention, a treatment liquor of γ-glycidoxypropyltrimethoxy silane or γ-methacryloxypropyltrimethoxy silane is preferable.

The second treatment step of the present invention, while generally known, is preferably a correctly prepared aqueous emulsion of the partially condensed resorcinol-formaldehyde resin and a latex consisting essentially of vinyl pyridine in combination with a natural or synthetic latex.

The formulation and use of resorcinol-formaldehyde latex dispersions in water is disclosed in numerous patents and references, including the following: U.S. Pat. No. 2,128,229; U.S. Pat. No. 2,561,215; U.S. Pat. No. 2,746,898; and M. W. Wilson, "Fabric Adhesion and RFL," Adhesive Age, 4, No. 4, pp. 32–36 (1963). While these references are concerned with the application of RFL dispersion to nylon or rayon, the same compositions and procedures can be followed in applying the second treating step to the polyester materials in the overall method of the present invention.

The preferable RFL for use in this invention can be prepared as follows: The molar ratio of resorcinol-formaldehyde resin can range from 1:3 to 2:1. The resorcinol-formaldehyde resin concentration can range from 8 to 20 percent. Caustic soda in amounts of from 2 to 8 percent can be added to the resorcinol-formaldehyde resin. The resulting adhesive composition is allowed to stand for from 6 hours to 24 hours at an ambient temperature of about 20° C., to age the resorcinol-formaldehyde. To the resulting aqueous solution of the resorcinol-formaldehyde resin, a latex is added at a weight ratio of 5:100 to 25:100. After the addition of the latex, the composition is allowed to stand for 2 to 10 hours at 20° C. to complete the aging. In this case, very effective results are achieved with known latices such as terpolymers of vinyl pyridine, butadiene and styrene. Curing temperatures, after applying the RFL, are at least about 120° C., and preferably, at least about 160° C. and above.

Curing of the resulting treated polyester material is preferably conducted for 5 to 120 seconds at temperatures of at least 200° C. The absorption of the RFL by the polyester material can range from 2 to 20 percent, preferably 4 to 10 percent, by weight of the polyester materials.

Said second treatment is advantageously conducted on cords or cord fabrics by conventional means used for treatment of nylon or rayon cords.

In this invention, a heat treatment after applying the silane compounds in the first treatment step can be omitted, if desired, but in such case, a heat treatment in the second treatment step of the RFL must be carried out at temperatures of at least about 200° C. and higher.

The most effective methods of the invention require heat treatments in the first and the second treatment steps, preferably at temperatures of at least about 200° C.

Treated polyester materials prepared by the method of this invention possess excellent adhesion to rubber.

Advantageously, in accordance with the present two-step method for treating polyesters, the first treatment agent can be prepared as an aqueous solution or emulsion without curing agents, and is capable of remaining stable for long periods of time.

Furthermore, when the method of the invention is conducted employing heat treatment in each step at a temperature of at least 200° C., undesirable shrinkage of the polyester material does not occur in vulcanizing with the rubber.

The following examples further illustrate the present invention without restricting the invention to the specific details actually shown.

EXAMPLE 1

Extruded filaments of polyethylene terephthalate are conducted over a godet roller which is immersed into the following treatment fluid or bath.

First step treatment fluid composition:

| Component | Parts by Weight |
|---|---|
| (Adhesive) | |
| γ-methacryloxypropyltrimethoxy silane | 35 |
| Methanol | 100 |
| Water | 100 |
| (Spinning Oil) | |

| | |
|---|---|
| White mineral oil | 28 |
| Oleyl laurate | 28 |
| Lauryl(cetyl) sulfonate Na | 7 |
| Ethylene oxide adduct of oleyl alcohol (5 moles of ethylene oxide) | 20 |
| Oleic acid | 2.5 |
| Water | 635 |

Said fluid has a pot life of 7 days.

The absorption of said fluid by the filaments was 10 percent by weight. Said filaments are stretched at 220° C. in a ratio of 1:5.8 and heat-set at 225°C. by touching a hotplate. Yarn of the obtained filaments exhibits a denier of 1,000 (200 individual filaments).

The first treated yarn thus obtained is then corded into a structure of 1,000 denier 2X, with 480 Z-turns and 480 S-turns per meter, thereafter it is subjected to further treatment in a second step with the aqueous dispersion of the RFL prepared as follows: The molar ratio of the resorcinol-formaldehyde resin (RF) was 1/1, RF concentration was 6 percent, and 4 percent of caustic soda to the RF was added. The adhesive composition was allowed to stand for 6 hours at an ambient temperature of 20° C. to age. To the resulting aqueous solution of the RF, a latex was added at a weight ratio of 15/100. The latex was a mixture of styrene-butadiene copolymer latex and vinyl-pyridine-styrene-butadiene copolymer latex (Hycar 2518 FS provided by Japanese Geon Co.). After the addition of the latex, the composition was allowed to stand for 16 hours at 20° C. to complete the ageing.

The absorption of the RFL by the cord was 6 percent by weight of the cord. The cord treated with the RFL was cured at temperatures and treatment times given in Table I. Rubber adhesions to the cord are shown in Table I.

TABLE I

| Temperature and Treating time in 2nd step (° C. × sec.) | Adhesive force by H-piece test (kg.)[1] | Rubber peel Strength (kg.)[2] | Shrinkage of cord[3] (%) |
|---|---|---|---|
| 160 × 60 | 12.7 | 0.71 | 10.5 |
| 180 × 60 | 12.9 | 0.80 | 9.8 |
| 200 × 60 | 13.1* | 1.12 | 6.9 |
| 200 × 60 | 13.4* | 1.28 | 5.3 |
| 240 × 60 | 13.8* | 1.42* | 4.2 |

[1] For the determination of the rubber adhesion, the treated cord is vulcanized at 150° C. for 30 minutes into a carcass mixture in such a manner that the adhesion length amounts to exactly 1 cm. The force is measured which must be applied in order to pull the cord out of the rubber piece.

[2] For the determination of the rubber peel strength, the treated cord is slightly buried or bonded in the surface of a piece of rubber carcass mixture and is vulcanized at 150° C. for 30 minutes. The strength is measured which must be applied in order to peel the cord from the rubber piece.

[3] The shrinkage of the cord is shown by a percentage of the cord dry-heated at 180° C. for 30 minutes as compared to untreated cord.

*The results showed that it was greater than the strength of cord or rubber which was ruptured.

EXAMPLE 2

Polyethylene terephthalate filaments are produced by the same means employed in Example 1 without the silane compound and corded into the same structure shown in Example 1. Thereafter, the cord is treated with the following treatment fluid:

| Component | Parts by Weight |
|---|---|
| γ-glycidoxypropyltrimethoxy silane | 1.0 |
| Water | 200 |
| (Pot life—10 days) | |

Said cord is treated with the RFL prepared in Example 1. The results are shown in Table II.

TABLE II

| Heat treatment | | Peel strength (kg.) | Adhesive force by H-piece test (kg.) |
|---|---|---|---|
| 1st treatment | 2nd treatment | | |
| 180° C.×60 sec. | 160° C.×60 sec. | 0.50 | 12.1 |
| 180° C.×60 sec. | 180° C.×60 sec. | 0.52 | 12.8 |
| 180° C.×60 sec. | 200° C.×60 sec. | 0.51 | 12.5 |
| 200° C.×60 sec. | 200° C.×60 sec. | 0.84 | 13.5* |
| 220° C.×60 sec. | 220° C.×60 sec. | 1.33 | 13.9* |
| 220° C.×60 sec. | 240° C.×60 sec. | 1.59* | 14.2* |

*Cord or rubber piece is ruptured.

EXAMPLE 3

Extruded polyethylene terephthalate filaments are treated solely with the spinning oil component of the first treatment fluid in Example 1 and stretched at 225° C., in ratio of 1:6 and subsequently the adhesive component alone of the first treatment fluid in Example 1 is applied. Further said filaments are heat-set at 230° C.

The resulting filament yarn exhibits a denier of 1,000 (210 individual filaments). Thereafter, said yarn is corded into a structure of 1,000 denier 2X, with 500 Z-turns and 500 S-turns per meter and the RFL given in Example 1 is applied thereto.

The cord treated with the RFL is heated at 220° C. for 60 seconds.

The adhesive force of the resulting cord was 13.5 kg. and the peel strength was 1.41 kg.

EXAMPLE 4

Untreated cord as employed in Example 2 is treated as shown in Table III, in which are given the results obtained.

EXAMPLE 5

A plane woven fabric made of polyester filament yarn (250 deniers with 50 filaments) is treated by the same method employed in Example 2.

The peel strength of said treated fabric to rubber is given in Table IV.

TABLE IV

| Heat treatment | | Peel strength[4] (kg./2.5 cm.) |
|---|---|---|
| 1st | 2nd | |
| 180°C. C. 60 sec. | 160° C. × 60 sec. | 8.9 |
| 200° C. × 60 sec. | 200° C. × 60 sec. | 20** |
| 220° C. × 60 sec. | 220° C. × 60 sec. | 22–23** |
| 220° C. × 60 sec. | 240° C. × 60 sec. | 27** |

TABLE III

| Silane compound | 1st treatment | | 2nd treatment with the RFL | | Adhesive force by H-piece test (kg.) | Peel strength (kg.) | Shrinkage of cord (percent) |
|---|---|---|---|---|---|---|---|
| | Temperature of heating (° C.) | Heating time (sec.) | Temperature of heating (° C.) | Heating time (sec.) | | | |
| Vinyltriethoxy silane | 200 | 60 | 230 | 60 | 12.1 | 0.5 | 5.8 |
| β (3,4-epoxycyclohexyl) ethyltrimethoxy silane | 220 | 40 | 240 | 40 | 12.9 | 0.99 | 4.9 |
| Vinyltri (β-methoxyethoxy) silane | 200 | 60 | 230 | 60 | 12.0 | 0.51 | 5.2 |

\*For the determination of the peel strength, the treated fabric of 2.5 cm. in width is slightly buried in the surface of a piece of rubber carcass mixture and is vulcanized at 150° C. for 30 minutes. The strength is measured which must be applied in order to peel the fabric from the rubber piece.

\*\*The rubber piece is ruptured.

What is claimed is:

1. A process for treating a polyester material for use in reinforcing rubber which process comprises the steps of treating said polyester material with a treatment liquor containing an effective adhesion promoting amount of a silane compound of the formula:

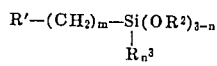

wherein R′ is an organic radical selected from the group consisting of vinyl, epoxycycloalkyl, glycidyloxy, acryloyloxy, methacryloyloxy and amino alkylene amino; $R^2$ is a radical selected from the group consisting of hydrogen, lower alkyl and lower alkoxy alkyl; $R^3$ is a lower alkyl radical; $m$ is an integer from 0 to 3; and $n$ is an integer of 0 to 1, and water-soluble condensation compounds thereof, treating the silane treated polyester material with a treatment agent containing as the sole adhesive a resorcinol-formaldehyde latex, and thereafter heat-treating the resulting polyester material at a temperature of at least 120° C.

2. A process in accordance with claim 1 wherein the treatment liquor is an aqueous solution containing γ-glycidoxypropyltrimethoxy silane.

3. A process in accordance with claim 1 wherein the treatment liquor is an aqueous solution containing γ-methacryloxypropyltrimethoxy silane.

4. A process in accordance with claim 1 wherein the treatment liquor is an aqueous solution containing β-3,4-epoxycyclohexyl)-ethyl trimethoxy silane.

5. A process in accordance with claim 1 wherein the treatment liquor is an aqueous solution containing N-(dimethoxymethlsilylpropyl) ethylene diamine.

6. A process in accordance with claim 1 wherein the treatment is an aqueous solution containing N-(trimethoxy-silylpropyl) ethylene diamine.

7. A process for treating a polyester material for use in reinforcing rubber which process comprises the steps of treating the heat-treated polyester material with a treatment liquor containing an effective adhesion promoting amount of a silane compound of the formula:

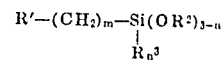

wherein R′ is an organic radical selected from the group consisting of vinyl, epoxycycloalkyl, glycidyloxy, acryloyloxy, methacryloyloxy and amino alkylene amino; $R^2$ is a radical selected from the group consisting of hydrogen, lower alkyl and lower alkoxy alkyl; $R^3$ is a lower alkyl radical; $m$ is an integer from 0 to 3; and $n$ is an integer of 0 or 1, and water-soluble condensation compounds thereof, heat-treating the resulting polyester material at a temperature of 150° to 240° C., treating the heat-treated polyester material with a treatment agent containing as the sole adhesive a resorcinol-formaldehyde latex and thereafter, heat-treating the resultant polyester material at a temperature of at least 120° C.

8. A process for treating a polyester material for use in reinforcing rubber which process comprises the steps of treating said polyester material with a treatment liquor containing an effective adhesion promoting amount of a silane compound of the formula:

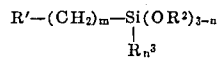

wherein R′ is an organic radical selected from the group consisting of vinyl, epoxycycloalkyl, glycidyloxy, acryloyloxy, methacryloyloxy and amino alkylene amino; $R^2$ is a radical selected from the group consisting of hydrogen, lower alkyl and lower alkoxy alkyl; $R^3$ is a lower alkyl radical; $m$ is an integer from 0 to 3; and $n$ is an integer of 0 or 1, and water-soluble condensation compounds thereof, heat-treating the resulting polyester material at a temperature of at least 200° C., treating the heat-treated material with a treatment agent containing as the sole adhesive a resorcinol-formaldehyde latex and thereafter heat-treating the resultant polyester material at a temperature of at least 200° C.

\* \* \* \* \*

UNITED STATES PATENT OFFICE
CERTIFICATE OF CORRECTION

Patent No. 3,642,518            Dated February 15, 1972

Inventor(s) Masakazu Miki, et al

It is certified that error appears in the above-identified patent and that said Letters Patent are hereby corrected as shown below:

Column 1, lines 10 and 20, "resorcinal" should read --resorcinol--. Column 2, line 36, column 7, line 15, and column 8, lines 8 and 29, that portion of the formula reading "$R_n 3$" should read --$R_n^3$--. Column 2, line 50, that portion of the formula reading:

also in Column 2, line 50, that portion reading "3.4" should read --3,4--. Column 4, line 9, --Tire-- should be inserted directly before "Fabric". Column 5, line 44, "200" should read --220--. Column 7, lines 36-37, that portion reading "β-3,4-epoxycyclohexyl)" should read --β(3,4-epoxycyclohexyl)--. Column 8, line 3, "the heat-treated" should read --said--; and line 39, --polyester-- should be inserted directly after "heat-treated".

Signed and sealed this 8th day of August 1972.

(SEAL)
Attest:

EDWARD M. FLETCHER, JR.            ROBERT GOTTSCHALK
Attesting Officer                  Commissioner of Patents